(No Model.)

G. & E. DEO.
STUMP EXTRACTING APPARATUS.

No. 417,711. Patented Dec. 24, 1889.

WITNESSES
C. J. Shipley
Walter H. Chamberlin

INVENTOR
George Deo
Eugene Deo
By Nels H. Leggett & Co.
Attorneys.

UNITED STATES PATENT OFFICE.

GEORGE DEO AND EUGENE DEO, OF NORTH BRANCH, MICHIGAN.

STUMP-EXTRACTING APPARATUS.

SPECIFICATION forming part of Letters Patent No. 417,711, dated December 24, 1889.

Application filed May 1, 1889. Serial No. 309,255. (No model.)

*To all whom it may concern:*

Be it known that we, GEORGE DEO and EUGENE DEO, citizens of the United States, residing at North Branch, county of Lapeer, State of Michigan, have invented certain new and useful Improvements in Stump-Extracting Apparatus; and I declare the following to be a full, clear, and exact description of the invention, such as will enable others skilled in the art to which it pertains to make and use the same, reference being had to the accompanying drawings, which form a part of this specification.

Our invention has for its object the production of an apparatus for extracting stumps and the like from the ground which shall be cheaply constructed, and in which the parts are so arranged that much more work can be done with a less expenditure of power than in the devices now in use.

Figure 1:
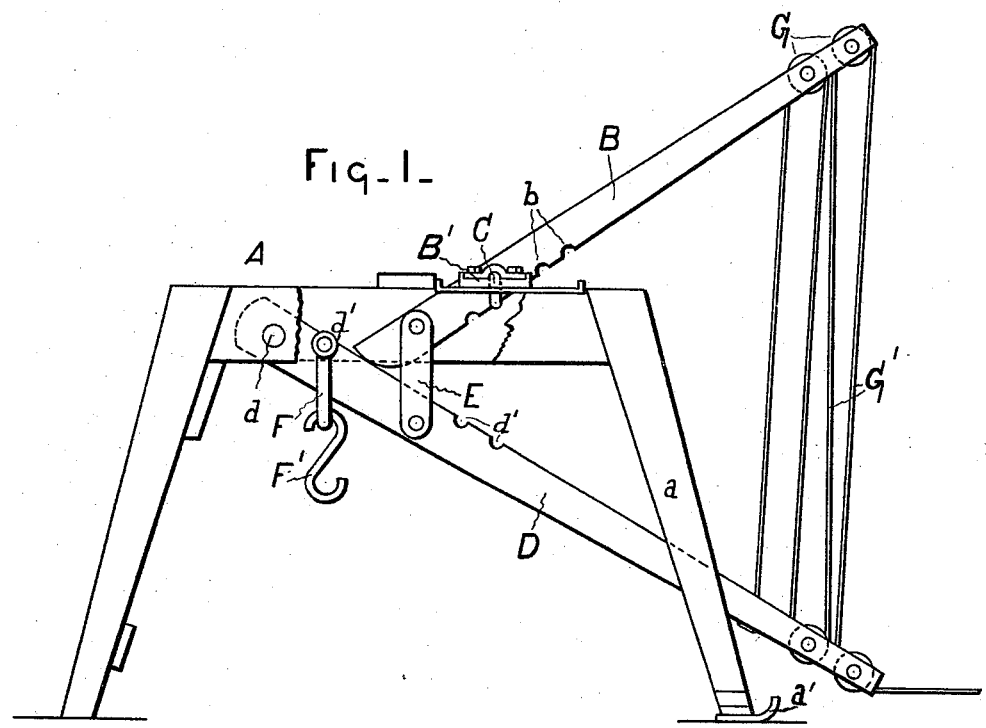
Figure 2:
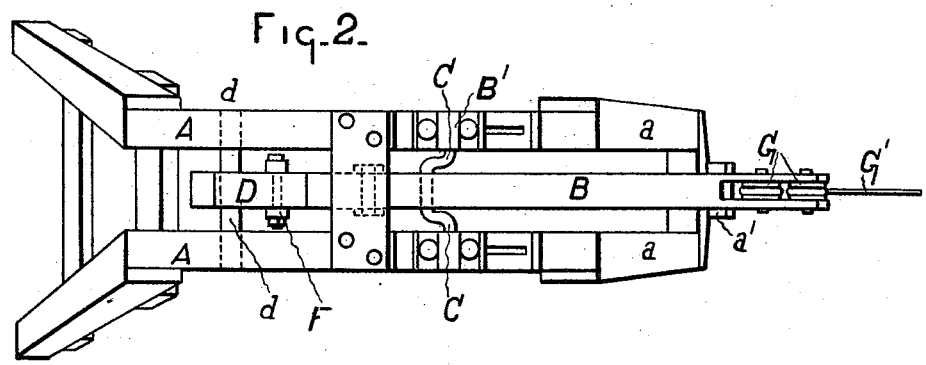

In the drawings, Figure 1 is a side elevation with parts broken away, and Fig. 2 is a plan view of our apparatus.

In carrying out our invention, A represents a suitable frame-work of such height that it may be set over the stump to be extracted.

B is a lever of the first class, pivotally fulcrumed by means of the stirrup C in the frame A.

D is another lever of the second class, fulcrumed at *d* to the frame.

E is a link pivotally connecting the short arm of the lever B with the lever D.

F is a clevis embracing the lever D and resting in the notches *d'*. By providing a series of these notches the clevis may be adjusted nearer or farther from the fulcrum, and thus increase or decrease the power.

F' is a hook engaged in the clevis, and to this hook the stump-chain is attached.

*a* are the legs of the machine-frame.

*b* are notches in the under side of the lever B to engage the stirrup C, and by providing a series of these the fulcrumage may be changed at will, and B' is a boxing on the frame A, in which the ends of the stirrup C rest. By making this boxing adjustable along the frame a double adjustment of the lever B is obtained.

G are series of pulleys on the outer ends of the levers, through which the rope G' is passed. Of course this rope may be attached to either lever and as many pulleys may be provided as desired; but I prefer to attach the rope to the lever D, pass it, as shown, over two pulleys in each lever, and extend it from the lower lever to the team or other source of power.

The operation will at once be seen. The power is exerted on the rope G' and the long arms of the levers are brought together. This causes the short arm of the lever B to rise, and it, being pivotally connected to the lever D, will exert a strong lifting-power thereon at the same time that a lifting-power is being applied to the outer end of the lever D by the rope. Thus by a double leverage and a utilization of the anchorage of the rope a much greater proportion of work can be done with the same expenditure of power over an apparatus wherein only one lever is employed.

If desired, one leg *a* of the frame may be provided with a shoe *a'*, whereby the frame may be easily moved to adjust it properly over the stump.

What we claim is—

1. A stump-extracting apparatus consisting of a suitable frame-work supported above the stump, two levers fulcrumed therein, the short arm of one lever being pivotally connected with the other lever, means on the latter for attaching the load, the stirrup C, and means for bringing the long arms of the two levers together, the construction being such that when the outer ends of the levers are brought together a lifting strain is exerted on the lever bearing the load, substantially as described.

2. A stump-extracting apparatus consisting of a suitable frame-work supported above the stump, two levers fulcrumed therein, the short arm of one lever pivotally connected with the other lever, means for attaching the load to the latter, the adjustable stirrup C, and a rope and pulleys on the outer ends of the levers, whereby power may be exerted to bring the two ends toward each other, substantially as described.

3. In a stump-extracting apparatus, the combination, with the frame and two levers B D, fulcrumed therein, the short arm of the lever B pivotally connected with the lever D, of the stirrup C, for pivotally supporting the lever B, and means for adjusting the same along the lever and along the frame, substantially as described.

4. In a stump-extracting apparatus, the combination, with the frame and the lever B, pivotally fulcrumed therein, of the lever D, fulcrumed to the frame and connected to the short arm of the lever B, and a clevis for attaching the load to the lever D, said lever provided with notches whereby the clevis may be adjusted to and from the fulcrum.

In testimony whereof we sign this specification in the presence of two witnesses.

GEORGE DEO.
EUGENE DEO.

Witnesses:
C. W. BALLARD,
W. MAHON.